US009664225B2

(12) United States Patent
Szczukowski et al.

(10) Patent No.: US 9,664,225 B2
(45) Date of Patent: May 30, 2017

(54) FASTENING MEANS FOR PRE-ASSEMBLY OF A PIN-SHAPED JOINING MEANS IN A THROUGH-HOLE OF A STRUCTURAL ELEMENT

(75) Inventors: Adi Szczukowski, Menden (DE); Benjamin Raeth, Iserlohn (DE); Bruno Da Rocha, Altena (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 454 days.

(21) Appl. No.: 13/131,172

(22) PCT Filed: Nov. 23, 2009

(86) PCT No.: PCT/EP2009/008307
§ 371 (c)(1),
(2), (4) Date: Aug. 3, 2011

(87) PCT Pub. No.: WO2010/060582
PCT Pub. Date: Jun. 3, 2010

(65) Prior Publication Data
US 2011/0286813 A1    Nov. 24, 2011

(30) Foreign Application Priority Data

Nov. 26, 2008   (DE) .................. 10 2008 059 137
Apr. 1, 2009    (DE) .................. 10 2009 016 633

(51) Int. Cl.
F16B 21/18    (2006.01)
F16B 41/00    (2006.01)

(52) U.S. Cl.
CPC ................................ *F16B 41/002* (2013.01)

(58) Field of Classification Search
CPC ...................................................... F16B 41/002
USPC ....... 411/352, 353, 103, 516, 517, 999, 970, 411/510, 107, 512; 248/635; 174/153 G; 16/2.1, 2.2
See application file for complete search history.

(56) References Cited

U.S. PATENT DOCUMENTS

| 1,499,071 | A | * | 6/1924 | Pleister | ..................... 411/80.5 |
| 1,665,875 | A | * | 4/1928 | Comeau | ..................... 411/337 |
| 1,996,128 | A | * | 4/1935 | Thomson | ..................... 411/27 |
| 2,972,367 | A | * | 2/1961 | Wootton | ..................... 411/350 |

(Continued)

FOREIGN PATENT DOCUMENTS

| DE | 10259976 A1 | 7/2004 |
| DE | 10297128 T5 | 8/2004 |
| WO | 2007087991 A1 | 8/2007 |

OTHER PUBLICATIONS

German Search Report for 10 2008 061 546.3-24 dated Feb. 24, 2010.

(Continued)

Primary Examiner — Gary Estremsky
(74) Attorney, Agent, or Firm — Hauptman Ham, LLP (57) ABSTRACT

A device for pre-assembly of a pin-shaped device in a through-hole of a structural element, including a cylinder barrel-shaped sleeve, a plurality of first holding elements disposed at an inner side of the sleeve and projecting inwards, and second holding elements projecting outwards from both ends of the sleeve and being elastically deformable, such that upon insertion of the fastening device into the through-hole, the second holding elements can perform an evasive movement.

42 Claims, 3 Drawing Sheets

(56) References Cited

U.S. PATENT DOCUMENTS

| | | | |
|---|---|---|---|
| 3,133,580 A * | 5/1964 | Katz | 411/134 |
| 3,559,730 A * | 2/1971 | Denjean | F16L 5/10 |
| | | | 165/158 |
| 4,133,245 A * | 1/1979 | Ruihley et al. | 411/80.1 |
| 4,551,110 A * | 11/1985 | Selvage et al. | 446/118 |
| 4,621,961 A | 11/1986 | Gulistan | |
| 4,624,585 A * | 11/1986 | Nix et al. | 384/296 |
| 4,640,479 A * | 2/1987 | Shely | H02G 3/0641 |
| | | | 16/2.2 |
| 4,664,574 A * | 5/1987 | Kasai | 411/508 |
| 4,735,536 A * | 4/1988 | Duran | F16B 5/01 |
| | | | 411/103 |
| 4,819,954 A * | 4/1989 | Fucci et al. | 277/598 |
| 4,952,107 A * | 8/1990 | Dupree | 411/103 |
| 4,978,265 A * | 12/1990 | De Wan | 411/80.2 |
| 5,395,194 A | 3/1995 | Johnson et al. | |
| 5,645,282 A * | 7/1997 | Belter | 277/598 |
| 5,730,258 A * | 3/1998 | Evans | F16D 55/22655 |
| | | | 188/71.1 |
| 6,174,118 B1 * | 1/2001 | Rebers et al. | 411/352 |
| 6,280,132 B1 * | 8/2001 | Szczukowski | F02F 7/006 |
| | | | 411/107 |
| 6,309,157 B1 * | 10/2001 | Amann et al. | 411/353 |
| 6,457,925 B1 * | 10/2002 | Genick, II | 411/353 |
| 6,582,171 B2 * | 6/2003 | Bondarowicz et al. | 411/353 |
| 6,769,851 B2 * | 8/2004 | Agha et al. | 411/353 |
| 7,029,219 B2 * | 4/2006 | Kovac | 411/353 |
| 7,059,022 B2 * | 6/2006 | Yuta et al. | 24/297 |
| 7,210,885 B2 * | 5/2007 | Pinzl | 411/353 |
| 2003/0108401 A1 * | 6/2003 | Agha et al. | 411/353 |
| 2004/0042873 A1 * | 3/2004 | Burmahln | 411/353 |
| 2004/0213645 A1 | 10/2004 | Kovac | |
| 2006/0216136 A1 | 9/2006 | Kovac | |
| 2009/0022566 A1 | 1/2009 | Chretien et al. | |
| 2010/0021263 A1 * | 1/2010 | Holt et al. | 411/107 |

OTHER PUBLICATIONS

International Search Report for PCT/EP2009/008307 dated Feb. 9, 2010.

* cited by examiner

FASTENING MEANS FOR PRE-ASSEMBLY OF A PIN-SHAPED JOINING MEANS IN A THROUGH-HOLE OF A STRUCTURAL ELEMENT

RELATED APPLICATIONS

The present application is national phase of PCT/EP2009/008307 filed Nov. 23, 2009 and claims priority from German Application Number 10 2008 059 137.8, filed Nov. 26, 2008, and German Application Number 10 2009 016 633.5, filed Apr. 1, 2009.

The invention relates to a fastening means for pre-assembly of a pin-shaped joining means in a through-hole of a structural element. The pre-assembly of a pin-shaped joining means, for instance, a screw or a threaded bolt, in a through-hole serves to combine in a simple way a pre-assembled structural component, that enables a fast and easy connection of the structural element to a further structural element using the joining means.

A suitable fastening means for this is known from the U.S. Pat. No. 5,395,194. It consists of a cylinder barrel-shaped sleeve. The sleeve, in its cross-section in the circumferential direction, has sections that alternatingly curve outwards and inwards. If the known fastening means is inserted into the bore of a structural element, outer surfaces of the outwards curved sections of the sleeve hold the sleeve in the bore in a form-fitting manner. Inward facing surfaces of the sleeve sections that are curved inwards hold a screw used in the sleeve also in a form-fitting manner. The elastic deformability of the known fastening means permits, in particular, the screw to be pre-assembled at different angles of inclination to the longitudinal axis of the bore. So that the fastening means cannot slip too deeply into the through-bore, the bore has a step, on which the front end of the fastening means that is facing away from the head of the screw is supported.

Starting from this, it is the object of the invention to provide a fastening means for the pre-assembly of a pin-shaped joining means in a through-hole of a structural element that can be used easily in the through-hole, and is held there particularly securely.

The object is achieved by the fastening means with the features of Claim 1. Advantageous designs are given in the subsequent dependent claims.

The fastening means, according to the invention has
a cylinder barrel-shaped sleeve,
a plurality of first holding elements disposed at the inner side of the sleeve and projecting inwards, and
second holding elements projecting outwards from both ends of the sleeve and being elastically deformable, such that upon insertion of the fastening means into the through-hole, the second holding elements can perform an evasive movement.

The fastening means is manufactured preferably as one-piece composed of plastic. The pin-shaped joining means can be, in particular, a screw or a threaded bolt. It has a shaft section that is held by the fastening means, and in addition can have further sections, in particular, a head. The through-hole can be a cylindrical bore, or also can have a rectangular or polygonal cross section.

The cylindrical barrel-shaped sleeve can have a cross-section that is circular, rectangular or polygonal, or corrugated. In the pre-assembled state, it encloses a joining means inserted in the sleeve, and can be inserted into the through-hole of a structural element.

The first holding elements, disposed on the inside of the sleeve and projecting inwards, are matched to a joining means in such a way that they can hold this joining means in the sleeve in either a form-fitting or a force-fitting manner. A form-fitting hold can be attained, for example, in connection to a threaded bolt if the first holding elements are provided with a threaded section. It is also conceivable to have a bayonet-like locking of the joining means in the sleeve.

The second holding elements that are disposed on both ends of the sleeve project outwards such that in the inserted state of the fastening means in a through-hole they engage behind the edges of the hole, and effect a form-fitting, hold of the fastening means in the through-hole. In particular, the second holding elements can project radially outward from an outer wall of the cylinder barrel-shaped sleeve. Preferably, in the inserted state of the fastening means, the second holding elements are disposed in an area of a recess or bevel at the edges of the through-hole, so that they do not project beyond the structural element in the direction of the through-hole. In order to attain the desired form-fitting hold of the fastening means, the second holding elements, in the inserted state of the fastening means, project in a radial direction beyond the edges of the through-hole, if the through-hole and the cylinder barrel-shaped sleeve have circular shaped cross-sections, a diameter formed by the outer ends of the second holding elements is larger than the smallest inner diameter of the through-hole.

For the fastening means to be able to be inserted into the through-hole despite the radial projection of the second holding elements, the second holding elements can be elastically deformed such that upon insertion of the fastening means into the through-hole, they can perform an evasive movement. When during the insertion, the second holding elements come into contact with a hole edge of the through-hole, they are deformed elastically and displaced preferably in the longitudinal direction of the sleeve, so that they can slide past at the hole edge into the through-hole. The elastic deformability of the second holding elements can be adapted to the dimensions of the respective through-hole such that the fastening means can be easily inserted, in particular, by hand. The entirety of the second holding elements can be elastically deformable. However, it is also possible that only a section of the second holding elements is elastically deformable, so that a section of the second holding element interacting with the through-hole can be displaced elastically due to the elastic deformation of another section of the second holding element.

With the invention, a form-fitting locking of the fastening means in the through-hole occurs due to the second holding elements. This prevents that the fastening means slides too deeply into the through-hole during insertion. At the same time, the fastening means cannot be simply withdrawn again from the through-hole, due to the second holding elements that are opening again on the back side of the through-hole, and that are again attaining their position projecting radially beyond the hole edge. Nevertheless, a disassembly of the fastening means is possible. For this, threes necessary for the renewed deformation of the second holding elements must be applied.

The joining means is held force-fitting and/or form-fitting in the fastening means by the first holding element. The joining means can be inserted up to different depths into the fastening means, where it remains in the desired position.

In principle, the fastening means can be held in the hole solely by the second holding elements, and in that, can have play in the radial and/or in the longitudinal direction, whereby tolerance compensation is possible. However, in one design of the invention, a plurality of third holding elements are arranged on the outside of the sleeve and projecting outward, wherein the second holding elements project further outward than the third holding elements. The third holding elements projecting outwards on the outside of the sleeve are matched to a through-hole, into which the sleeve must be inserted, such that they can hold the fastening means in the through-hole in a force-fitting manner. In this way, in addition to the hold provided by the second holding elements, the fastening means is held in the through-hole in a force-fitting manner also by the third holding elements projecting outwards.

In one design, a material weakening is formed between the sleeve and the second holding elements. The material weakening can be, in particular, an area with reduced wall thickness, holes, notches, other recesses or another measure, which effects a mechanical weakening between the sleeve and the second holding elements. Therefore, the desired elastic deformation, necessary for the evasive movement occurs specifically in the region of the material weakening. Preferably, the material weakening is formed in the circumferential direction, or nearly in the circumferential direction of the sleeve so that the free ends of the second holding elements that are distanced from the material weakening, can be pivoted in a circular arc, wherein the free ends, starting from a neutral position, move partially in the longitudinal direction of the sleeve.

In one design, the second holding elements in a cross-section through a symmetry axis of the sleeve have a longitudinal direction running obliquely outwards and from the plane of the respective end of the sleeve in the direction towards the plane of the other end of the sleeve. In this arrangement, during insertion of the fastening means into a through-hole, the free ends of the second holding elements, at the edge of the sleeve to be inserted into the through-hole, are inclined obliquely away from the edge of the through-hole. Therefore, they must pivot only by a relatively small angle with respect to their neutral position in order to be able to insert the fastening means into the through-hole. If, however, the fastening means must be withdrawn again from the through-hole, a pivot movement of the second holding elements by a greater angle is necessary to accomplish this. Therefore, the withdrawal of the fastening means requires a relatively large expenditure of force. Thus, the fastening means can be inserted easily, and a secure locking in the through-hole is attained.

According to one design, the second holding elements in a cross-section through a symmetry axis of the sleeve taper and/or form a tip with increasing distance from the sleeve. This implementation favors an elastic deformation in the area of the free ends of the second holding elements. Thereby, the second holding elements, in particular even with manufacturing tolerances, can come into contact with the hole edges of the through-hole and promote a centered seating of the fastening means with respect to the longitudinal axis of the sleeve. In addition, radial play of the fastening means in the hole is possible, for the case that the second holding elements are supported also in the radial direction in the area of the hole edges.

In one design, the first and/or second holding elements each comprise a bar-shaped elastically deformable section, which runs essentially in axial direction of the sleeve, where one end of the bar-shaped section is connected to the sleeve. In this design, the sleeve extends solely over a longitudinal section of the fastening means, wherein one or several further longitudinal sections are formed by the bar-shaped sections. The sleeve can be, in particular, a ring that is centrally disposed with respect to the length of the fastening means, and from whose ends bar-shaped sections of the first and/or second holding elements extend in both directions. Due to the bar-shaped sections, a good displaceability is attained of the sections of the first or second holding elements interacting with the joining means or the through-hole in the structural element, wherein the retaining forces can be adjusted by the selective formation of the bar-shaped sections.

According to one design, bar-shaped sections of the first holding elements are inclined radially inwards with respect to the cylinder barrel surface circumscribing the sleeve. This leads to the fact that the bar-shaped sections of the first holding elements, when the fastening means is inserted in a through-hole, can be inclined outwards due to deformation of the bar-shaped section, until the outer sides of the bar-shaped sections rest against the through-hole. Due to the inward inclination of the bar sections, the position of the first holding elements can be displaced in a relatively large area, so that a correspondingly large tolerance compensation is possible whim regards to the position of the joining means in the sleeve.

In one design, bar-shaped sections of the first holding elements have a smaller cross-sectional area than bar-shaped sections of the second holding elements. Alternatively and/or additionally, the bar-shaped sections of the first holding elements can have a shorter length than the bar-shaped sections of the second holding elements. Both designs lead to the fact that the position of the first holding elements can be changed with lower forces than the position of the second holding elements. Thereby, the fastening means is anchored more solidly in the through-hole of the structural element than the joining means in the fastening means. Thereby, the position of the joining means in the fastening means can be aligned easily without the fastening means inadvertently being withdrawn from the through-hole or forced too deeply into it. The variation of the cross sectional areas can occur, in particular, by an enlargement or reduction of the bar-shaped sections in the circumferential direction, or by the selection of a larger or smaller thickness of the bar-shaped sections in the radial direction.

In one design, the first holding elements each have an inwardly directed tooth, which can interact with a contour of the pin-shaped joining means such that the joining means is held in a form-fitting manner. For example, the tooth can engage in a thread of the joining means or in a circumferential groove, which has the contour. Thereby, on the one hand, a firmer hold of the connecting means in the joining means can be attained, and on the other hand specific targeted arrangements of the joining means with respect to the fastening means can be favored, so that an insertion of the connecting means in a desired position is simplified.

According to one design, the second holding elements have contact surfaces disposed such that they abut a chamfer of the through-hole surface-to-surface, when the fastening means is inserted in the through-hole. Due to such a surface-to-surface contact, a particularly solid and precisely it hold of the fastening element in the through-hole is attained.

In one design, the second holding elements form a circumferential collar at the respective end of the sleeve. Thereby, the second holding elements effect a form-fitting anchoring of the fastening means in the through-hole along the entire periphery. At the same time, an increased expenditure of force is necessary to "roll up" the collar, which improves the extraction resistance of the fastening means.

In one design, the circumferential collar consists of collar segments separated by slots. Preferably, the slots can extend into the area with the material weakening. Through the introduction of slots, the force necessary for the deformation can be modified. In particular, the slots facilitate a partially radially inwards directed pivot movement of the collar segments, and with that the insertion of the fastening means into a through-hole.

In one design, the circumferential collar has a conical front face at the side directed away from the sleeve. The conical front face acts as a guide at the hole edge of the through-hole and facilitates the insertion of the fastening means.

According to one design, the front face of the sleeve is conical. The conical front face acts as a guide of a joining means to be inserted into the fastening means, and thus facilitates its insertion.

According to one design, the circumferential collar comprises a conical front face, which is merging into the conical front face of the sleeve. In this design, the conical front face at the circumferential collar also contributes to guiding the joining means into the fastening means.

According to one design, the first and/or third holding elements are formed by surface segments of the sleeve. This can be attained, for example, by a progression of the inner and/or outer wall of the sleeve that is undulating in the circumferential direction of the sleeve. In this design, the first and/or third holding elements are formed as one-piece with the cylinder barrel-shaped sleeve.

According to a further design, the first and/or third holding elements are projections that project from the sleeve. The projections can project from the inner or outer wall of the sleeve, for example, in a radial direction or obliquely to the radial direction. The projections can be formed, for example, knob-shaped, fin-shaped or rib-shaped.

In one design, the projections are ribs that extend over a major part of the length of the sleeve. The ribs can be directed in the longitudinal direction of the sleeve, however, they can also be directed obliquely to the radial direction of the sleeve, for example, progressing spiral-shaped at the inner or outer wall of the sleeve. Due to the extent of the ribs over a major part of the length of the sleeve, a good hold is attained of the fastening means in the through-hole, or of the joining means in the fastening means. At the same time, the continuous progression of the ribs in the longitudinal direction of the sleeve facilitates the insertion of the fastening means into the through-hole, or of the joining means into the fastening means. The ribs can have a rectangular cross-section, or with increasing distance from the sleeve, can taper and/or form a tip. Also, multiple, closely adjacent ribs can be arranged next to each other in groups. Through the described different designs and arrangements, and through the selected number of ribs, the force-fitting hold can be adapted to the intended use ease.

In a further design, the first and/or the third holding elements are elastically deformable, such that the distance and or the angular position of a joining means held by the first holding means can be changed with respect to the longitudinal axis of a through-hole in which the fastening means is being held by the third holding elements. Due to the changeability of the position or the angular position, it is easy to compensate, in particular, for manufacturing tolerances.

In one design, the first holding elements are disposed circumferentially offset with respect to the third holding elements. Due to the fact that the first and third holding elements are not located directly across from each other with respect to the wall of the sleeve, the displacements of the contact surfaces of the first and third holding elements that are necessary for the pre-assembly with the joining means or the through-hole, can be effected, in part, by a deformation of the sleeve. Then, the elastic forces for the force-fitting hold of the joining means in the fastening means and the fastening means in the through-hole are generated in part by a deformation of the sleeve.

In one design, a first holding element and a second holding element, in each case, are disposed pair-wise at the same circumferential position of the sleeve, where in a circumferential direction, the first holding elements and the second holding elements are disposed alternating. In particular during the displacement of a joining means inserted into the fastening means with respect to a structural element into which the fastening means is inserted, the special symmetry of this arrangement leads to forces that are largely independent of the direction of movement of the joining means crosswise to its longitudinal direction.

The above object is also attained by a structural component with the features of Claim 22. The structural component comprises a structural element having a through-hole, a pin-shaped joining means, and a fastening means. The fastening means has
  a cylinder barrel-shaped sleeve,
  a plurality of first holding elements disposed at an inner side of the sleeve and projecting inwards,
  second holding elements projecting outwards from both ends of the sleeve and being elastically deformable, such that upon insertion of the fastening means into the through-hole, the second holding elements can perform an evasive movement,
  wherein the fastening means is inserted into the through-hole and the joining means is held by the fastening means.

The structural component according to the invention is thus composed of a fastening means, with the features of Claim 1, preassembled in the through-hole of a structural element, in which a pin-shaped joining means is held. Preferably, the fastening means is designed according to the Claims 2 to 21.

In one design, the first holding elements are holding the joining means in a force-fitting manner, the third holding elements are holding the fastening means in the through-hole in a force-fitting manner, and the second holding elements are holding the fastening means in the through-hole in a form-fitting manner.

In one embodiment, the first holding elements are holding the joining means in a force-fitting manner and/or in a form-fitting manner in the fastening means and the second holding elements are holding the fastening means in the through-hole in a form-fitting manner, wherein the first and second holding elements are adapted to the joining means and the through-hole such that the holding force of the fastening means in the through-hole is stronger than the holding force of the joining means in the fastening means. Thereby, the position of the joining means relative to the structural element can be shifted without the fastening means being inadvertently removed from the desired position in the through-hole of the structural element.

The invention is described in more detail in the following based on two exemplary embodiments represented in twelve figures.

They show:
  FIG. 1 a perspective view of a fastening means according to the invention,
  FIG. 2 a cross-sectional representation along the axis of symmetry of the fastening means from FIG. 1 in the inserted state in a structural element, FIG. 3 a top view of the arrangement from FIG. 2 in the direction of the axis of symmetry of the fastening means, FIG. 4 a cross-section corresponding to FIG. 2, in which in addition, a threaded bolt is inserted up to the head in the fastening means, FIG. 5 the arrangement from FIG. 4, wherein the threaded bolt is inserted into the fastening means only so deep that its front end is flush with the lower edge of the fastening means and encloses the structural element.

Figure 1:
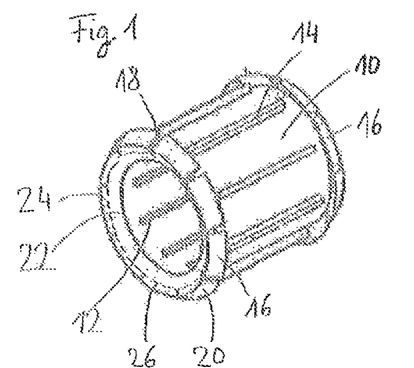

The fastening means represented in FIG. 1 is composed of a cylinder barrel-shaped sleeve 10, first holding elements 12, third holding elements 14 and second holding elements 16. The sleeve 10 has a circular cross-section and a uniform wall thickness. The length of the sleeve 10 is somewhat larger than its diameter.

The first holding elements 12 on the inner side of the sleeve 10 are ribs with a rectangular cross-section projecting radially inwards from the inside of the sleeve 10. The first holding elements 12 extend in the longitudinal direction of the sleeve 10 over a major part of the entire length of the sleeve 10. However, the sleeve 10 at both ends projects slightly beyond the first holding elements 12. In total, nine first holding elements 12 are present.

The third holding elements 14 on the outside of the sleeve 10 have a rectangular cross-section. They project radially outwards from the cuter wall of the sleeve 10. They run in the longitudinal direction of the sleeve 10, and extend over a major portion of the length of the sleeve 10, wherein the sleeve 10 projects beyond the third holding elements 14. In total, nine third holding elements 14 are present.

The second holding elements 16 are formed at both ends of the sleeve 10, and project outwards from there. The second holding elements 16 project further outwards than the third holding elements 14. At each end of the sleeve 10, the second holding elements 16, in each case, form a circumferential collar, which is interrupted, respectively, by nine slots 18. Each second holding element 16 forms a collar segment. The circumferential collar formed by the second holding elements has on its side facing away from the sleeve a conical front face 20 that corresponding to the collar segments is divided by the slots 18. The front faces 22 of the sleeve 10 are also formed conically and merge into further conical surface sections 24 of the second fastening elements 16.

A circumferential material weakening 26 is present between the second holding elements 16 and the sleeve 10, and is represented in FIG. 1 by a dashed line. In this region, the material of the fastening means has a relatively thin wall thickness.

Figure 2:
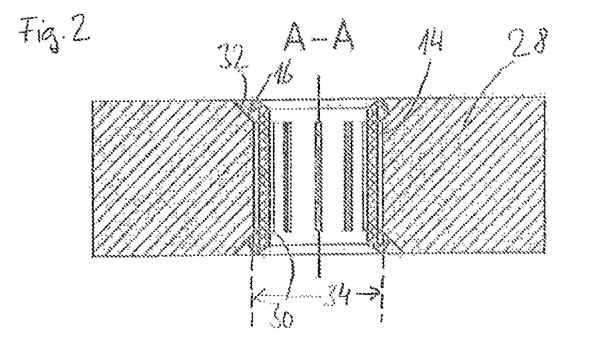

In FIG. 2, the inserted state of the fastening means in a structural element 28 is shown in cross-section. The two ends of the fastening, means are flush with the structural element 28. The third holding elements 14 are in contact with the through-hole 30 of the structural element 28, and hold the fastening means in it, in a force-fitting manner. The hole edge of the through-hole has a chamfer 32 at both ends that makes a free space available for the second holding elements 16. The second holding elements 16 project radially outwards beyond the diameter of the through-hole indicated with 34. The free ends of the second holding elements 16 are in contact with the conical surfaces of the chamfers 32, and lock the fastening means in the structural element 28 in a form-fitting manner.

Figure 3:
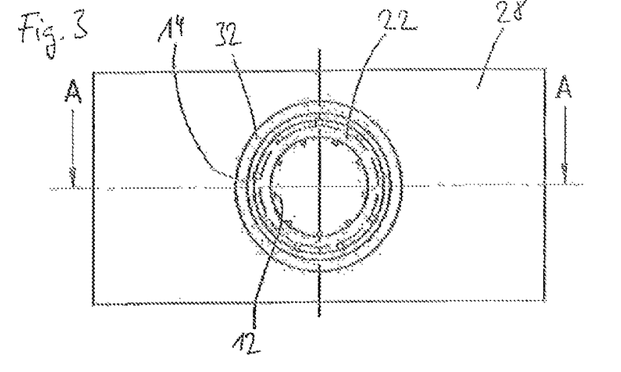

In the top view in FIG. 3, the conical front face 22 of the sleeve, and the first holding elements 12 and respectively the third holding elements 14, arranged on the inside and outside of the sleeve 10, can be seen. The first holding elements 12 are disposed offset with respect to the third holding elements 14, in the circumferential direction of the sleeve 10. A first holding element 12 is located respectively centrally between two third holding elements 14, and vice versa, relative to the circumferential direction of the sleeve. In FIG. 3, the chamfer 32 of the through-hole, which extends radially outward farther than the second holding elements 16, can also be seen.

Figure 4:
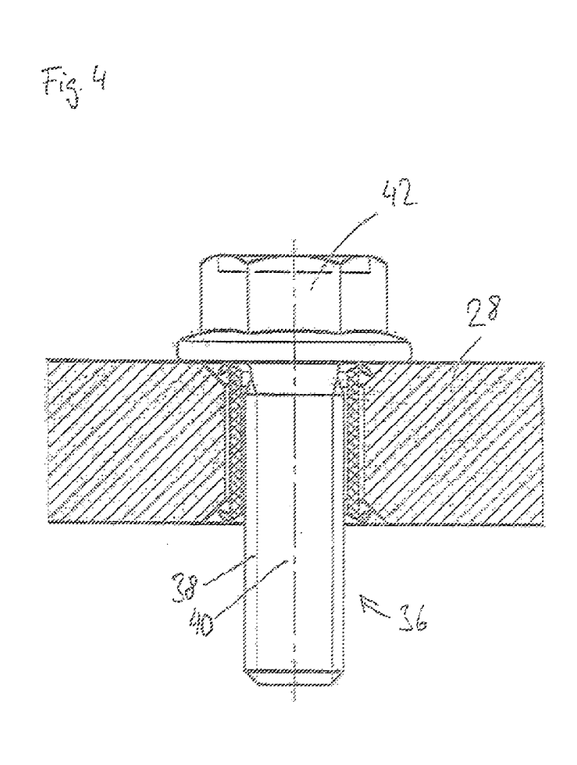
Figure 5:
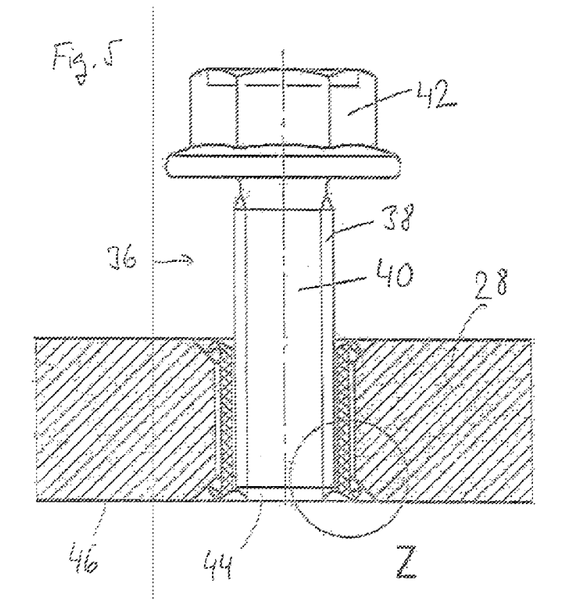

In the representations of FIGS. 4 and 5, the fastening means is again inserted in a structural element 28. In addition, a pin-shaped joining means in the shape of a threaded bolt 36 is represented that has a head 42 and a shaft section 40, provided with a thread 38. In FIG. 4, the front face of the head 42, facing towards the shaft section 40, is in contact with the structural element 28. In the position shown in FIG. 5, the front end 44 of the threaded bolt 36 is flush with the lower edge 46 of the structural element 28.

Figure 6:
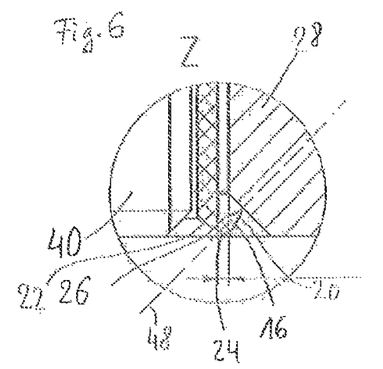
FIG. 6 a sectional enlargement of the section from FIG. 5 labeled with "Z"

Based on the sectional enlargement of FIG. 6, the arrangement of the second holding elements 16 will be described in more detail. In the represented cross-section, the thin wall thickness in the area of the material weakening 26 can be seen. The second holding element 16 can be pivoted around this region through elastic deformation. A longitudinal direction of the second holding elements 16 is illustrated by the dashed line 48, and runs obliquely outwards from the plane of the lower end of the sleeve in the direction to the plane of the other end of the sleeve. The second holding elements 16 taper in this direction with increasing distance from the sleeve, and form a tip.

The conical front face 22 of the sleeve 10, the conical front face 20 at the second holding elements 16 and the further conical front face 24 at the second holding elements 16, which merge in a straight line into the conical front face 22 of the sleeve, can also be easily recognized.

The exemplary embodiment shown in the FIGS. 7 to 12 differs, in particular, by the design of the first and second holding elements. In the lateral top view of FIG. 7, it can be seen that the sleeve 50 is limited to a ring, arranged approximately centrally in the longitudinal direction of the fastening means. First holding elements 52, which are arranged essentially in the axial direction of the sleeve, extend from both ends of the sleeve 50. Outer surfaces of the first holding elements 52 are inclined slightly inwards, so that with increasing distance from the sleeve 50 they are arranged at an increasing distance from an imaginary cylinder barrel that circumscribes the outside of the sleeve 50. Therefore, they can be displaced in the direction toward this cylinder barrel. Each first holding element 52 is composed of a bar-shaped section 54, whose one end is connected to an end of the sleeve 50, and a tooth 56 extending, inwards from the bar-shaped section 54.

Figure 7:
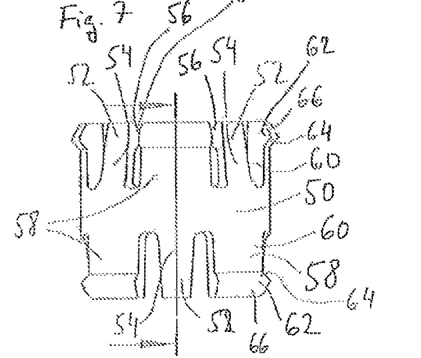
FIG. 7 a second exemplary embodiment of a fastening means according to the invention in a top view from the side, FIG. 8 the fastening means from FIG. 7 in a cross-section in the longitudinal direction at the position in FIG. 7 designated with arrows, FIG. 9 a top view of the fastening means from FIG. 7 in an axial direction, FIG. 10 a perspective view of the fastening means from FIG. 7, FIG. 11 a structural component with a structural element and a joining means inserted therein using the fastening means from FIG. 7 in a partial sectional representation, and FIG. 12 a sectional enlargement from FIG. 11.

Second holding elements 58 also extend from both ends of the sleeve 50 in an essentially axial direction. These, in each case, also have a bar-shaped section 60, whose one end is connected to the sleeve 50. A tooth 62 is arranged at the other end of each bar-shaped section 60, and it extends radially outwards and has a contact surface 64, which can abut surface-to-surface against a chamfer of a through-hole. The surfaces 66 of the teeth 62, lying opposite from these contact surfaces 64, lie on an imaginary cone, whereby the insertion of the fastening means into the through-hole of a structural element is simplified.

The teeth 56 of the first holding elements 52 also have inclined surfaces 57 that lie on an imaginary cone and that simplify the insertion of a joining means in the fastening means.

At both ends of the sleeve 50, first holding elements 52 and second holding elements 58 alternate, respectively, in the circumferential direction of the fastening means. At a specific circumferential position of the fastening means, in each case, at one end, a first holding element 52 is arranged, and at the opposite end, a second holding element 58.

As can be recognized in FIG. 7, the bar-shaped sections 60 of the second holding elements 58 have a greater width in the circumferential direction than the bar-shaped sections 54 of the first holding elements 52. Therefore, they can be displaced with respect to their rest position only by a greater expenditure of force than the first holding elements 52.

Figure 8:
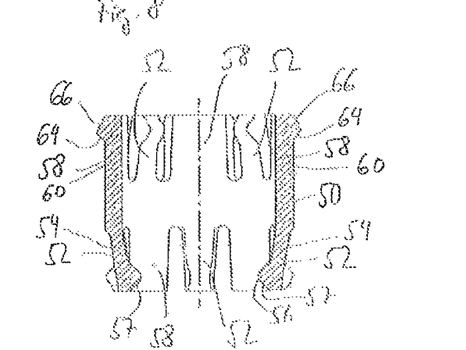

In the sectional representation of FIG. 8, the elements already described are provided with the same reference numbers. It is particularly easy to recognize the inclined arrangement of the first holding elements 52 as well as the arrangement of the surfaces 66 or 57 lying on an imaginary cone. Furthermore, it can be seen that the bar-shaped sections 54 of the first holding elements 52 have a smaller thickness in the radial direction than the bar-shaped sections 60 of the second holding elements 58.

In each case, notch-shaped free spaces are formed between the first holding elements 52 and the second holding elements 58.

Figure 9:
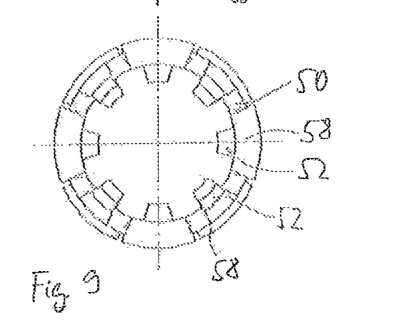

In the top view of FIG. 9, in particular, the pair-wise arrangement that is alternating around the circumference of the first holding elements 52 and the second holding elements 58 can be recognized.

Figure 10:
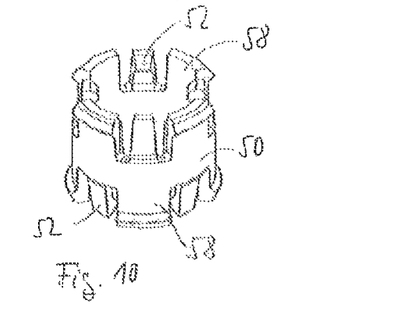

The perspective representation of FIG. 10 provides a good spatial impression of the fastening means.

Figure 11:
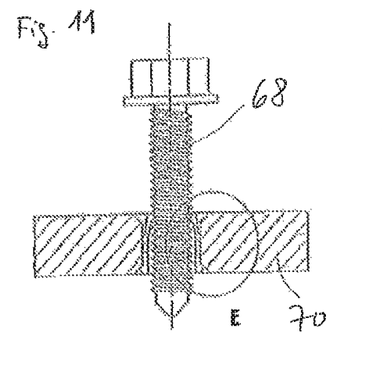
Figure 12:
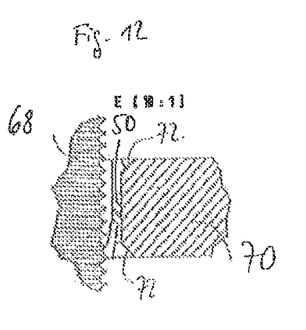

FIG. 11 shows a joining means in the shape of a screw 68 inserted in a fastening means; the screw being provided with a thread over approximately its entire length. The fastening means is inserted into a through-hole of a structural element 70. As is particularly clear in the sectional enlargement of FIG. 11, the tooth 56 of the first holding element 52 engages in a turn of the thread of the screw 68, and effects an additional form-fitting hold. The representation also makes it clear that tolerance compensation is possible through the displacement of the screw 68 crosswise to its longitudinal direction due to a corresponding displacement of the first holding elements 52. Furthermore, it can be recognized that the contact surfaces 64 of the second holding elements 58 abut against a chamfer 72 of the through-hole of the structural element 70.

The invention claimed is:

1. A fastening apparatus configured for pre-assembly of a pin-shaped joining means in a through-hole of a structural element comprising:
a cylinder barrel-shaped sleeve,
a plurality of first holding elements disposed at an inner side of the sleeve and projecting inwards, and
second holding elements projecting outwards from both ends of the sleeve and being elastically deformable, such that upon insertion of the fastening apparatus into the through-hole, the second holding elements can perform an evasive movement such that the second holding elements are located at least partially within the through-hole, wherein a body forming the barrel-shaped sleeve extends completely between the second holding elements at both ends of the sleeve, wherein at least one of:
the second holding elements in a cross-section through a symmetry axis of the sleeve have a longitudinal direction running obliquely outwards and from the plane of the respective end of the sleeve in the direction towards the plane of the other end of the sleeve;
the second holding elements in a cross-section through a symmetry axis of the sleeve taper and/or form a tip with increasing distance from the sleeve; or
wherein a material weakening is defined between the sleeve and the second holding elements.

2. The fastening apparatus of claim 1, wherein a plurality of third holding elements projecting outwards are disposed at an outer side of the sleeve, wherein the second holding elements project farther outwards than the third holding elements.

3. The fastening apparatus of claim 2, wherein the first holding elements and/or third holding elements are formed by surface segments of the sleeve.

4. The fastening apparatus of claim 2, wherein the first holding elements and/or third holding elements are projections projecting from the sleeve.

5. The fastening apparatus of claim 4, wherein the projections are ribs which are extending over a major part of the length of the sleeve.

6. The fastening apparatus of claim 2, wherein the first holding elements and/or third holding elements are elastically deformable, such that the distance and/or the angular position with reference to the longitudinal axis of a through-hole in which the fastening means is being held by the third holding elements can be changed.

7. The fastening apparatus of claim 1, wherein the material weakening is defined between the sleeve and the second holding elements.

8. The fastening apparatus of claim 1, wherein the second holding elements in the cross-section through the symmetry axis of the sleeve have the longitudinal direction running obliquely outwards and from the plane of the respective end of the sleeve in the direction towards the plane of the other end of the sleeve.

9. The fastening apparatus of claim 1, wherein the second holding elements in the cross-section through the symmetry axis of the sleeve taper and/or form the tip with increasing distance from the sleeve.

10. The fastening apparatus of claim 1, wherein the first and/or second holding elements each comprise a bar-shaped, elastically deformable section which runs substantially in an axial direction of the sleeve, one end of the bar-shaped section being connected to the sleeve.

11. The fastening apparatus of claim 10, wherein the bar-shaped sections of the first holding elements are inclined radially inwardly with reference to a cylinder barrel surface circumscribing the sleeve.

12. The fastening apparatus of claim 10, wherein bar-shaped sections of the first holding elements have a smaller cross-sectional area than bar-shaped sections of the second holding elements.

13. The fastening apparatus of claim 1, wherein the first holding elements each comprise a tooth directed inwardly which can cooperate with a contour of the pin-shaped joining means such that the joining means is held in a form-fit manner.

14. The fastening apparatus of claim 1, wherein the second holding elements comprise contact surfaces disposed such that they abut a chamfer of the through-hole surface-to-surface when the fastening means is disposed in the through-hole.

15. The fastening apparatus of claim 1, wherein the second holding elements form a circumferential collar at the respective end of the sleeve.

16. The fastening apparatus of claim 15, wherein the circumferential collar consists of collar segments separated by slots.

17. The fastening apparatus of claim 15, wherein the circumferential collar comprises a conical front face at a side directed away from the sleeve.

18. The fastening apparatus of claim 17, wherein the circumferential collar comprises a conical front face which is merging with the conical front face of the sleeve.

19. The fastening apparatus of claim 1, wherein a front face of the sleeve is conical.

20. The fastening apparatus of claim 1, wherein the first holding elements are disposed circumferentially offset with respect to third holding elements.

21. The fastening apparatus of claim 1, wherein a first holding element and a second holding element are disposed pair-wise at the same circumferential position of the sleeve, wherein in a circumferential direction, first holding elements and second holding elements are disposed in turn.

22. The apparatus of claim 1, wherein the fastening apparatus is symmetrical about a plane normal to a longitudinal axis of the fastener apparatus.

23. The fastening apparatus of claim 1, wherein respective lengths of the plurality of first holding elements are at least substantially the same as respective lengths of the second holding elements relative to a longitudinal direction of the sleeve.

24. The fastening apparatus of claim 1, wherein the plurality of first holding elements have respective thickness as measured on a plane normal to a longitudinal axis of the sleeve that is less than the distance between adjacent holding elements of the plurality of holding first elements, the distance being located on the plane.

25. A structural component with a structural element having a through-hole, a pin-shaped joining means and a fastening means which comprises
  a cylinder barrel-shaped sleeve,
  a plurality of first holding elements disposed at an inner side of the sleeve and projecting inwards, and
  second holding elements projecting outwards from both ends of the sleeve outwards and being elastically deformable, such that upon insertion of the fastening means into the through-hole, the second holding elements can perform an evasive movement such that the second holding elements are located at least partially below or flush with an outer surface of the structural element that is normal to the longitudinal axis of the through-hole,
  wherein the fastening means is inserted into the through-hole and the joining means is held by the fastening means, and wherein a material weakening is defined between the sleeve and the second holding elements, and
  a cross-sections through the cylinder barrel-shaped sleeve on a plane normal to a longitudinal axis of the sleeve establishes a contiguous path about the longitudinal axis, the plane being proximate an end of the sleeve.

26. The structural component of claim 25, wherein the first holding elements are holding the joining means in a force-fit manner, third holding elements are holding the fastening means in the through-hole in a force-fit manner and the second holding elements are holding the fastening means in the through-hole in a form-fit manner.

27. The structural component of claim 25, wherein the first holding elements are holding the joining means in a force-fit manner and/or in a form-fit manner in the fastening means and the second holding elements are holding the fastening means in the through-hole in a form-fit manner, wherein the first and second holding elements are adapted to the joining means and the through-hole such that the fixing of the fastening means in the through-hole is stronger than the fixing of the joining means in the fastening means.

28. The structural component of claim 25, wherein respective lengths of the plurality of first holding elements are at least substantially the same as respective lengths of the second holding elements relative to a longitudinal direction of the sleeve.

29. The structural component of claim 25, wherein the plurality of first holding elements have respective thicknesses as measured on a plane normal to a longitudinal axis of the sleeve that is less than a distance between adjacent holding elements of the plurality of first holding elements, the distance being located on the plane.

30. An apparatus, comprising:
  a fastener apparatus configured for pre-assembly of a pin-shaped means for joining in a through-hole of a structural element, the fastener apparatus comprising:
  a cylinder barrel-shaped sleeve,
  a plurality of first means for holding the joining means disposed at an inner side of the sleeve, and
  a plurality of second means for holding the fastener apparatus in the through-hole of the structural element and performing an evasive movement, at least one of the second means for holding being located at one end of the sleeve, and at least one other of the second means for holding being located at the opposite end of the sleeve, and wherein the plurality of second means are configured to be located at least partially within the through-hole of the structural element, wherein
  the ends of the sleeve are substantially identical to one another; and
  at least one of:
    respective lengths of the plurality of first means are at least substantially the same as respective lengths of the plurality of second means relative to a longitudinal direction of the sleeve; or
    the plurality of first means have respective thickness as measured on a plane normal to a longitudinal axis of the sleeve that is less than the distance between adjacent first means of the plurality of first means, the distance being located on the plane.

31. The apparatus of claim 30, further including the structural element, wherein the structural element is symmetric about a plane normal to a longitudinal axis of the structural element.

32. The apparatus of claim 30, further including the structural element, the structural element includes a continuous unbroken path without a beginning or an end through a monolithic structure that circumnavigates a longitudinal axis of the structural element.

33. The apparatus of claim 30, wherein the fastener apparatus is symmetric about a plane normal to a longitudinal axis of the structural element.

34. The apparatus of claim 30, wherein the second holding elements are of the same configuration.

35. The apparatus of claim 30, wherein the second holding elements are identical to one another.

36. The apparatus of claim 30, wherein the fastener apparatus is at least substantially symmetrical about a plane normal to a longitudinal axis of the fastening means.

37. The apparatus of claim 30, wherein the second holding elements are at least substantially identical to one another.

38. The apparatus of claim 30, wherein the second holding elements are at least substantially of the same configuration.

39. The apparatus of claim 30, wherein the ends are respective longitudinal boundaries of the sleeve.

40. The apparatus of claim 30, wherein the second holding elements are located at least substantially as far apart from one another as possible while still being connected to the sleeve.

41. The apparatus of claim 30, wherein the respective lengths of the plurality of first means are at least substantially the same as the respective lengths of the plurality of second means relative to the longitudinal direction of the sleeve.

42. The apparatus of claim 30, wherein the plurality of first means have respective thickness as measured on the plane normal to the longitudinal axis of the sleeve that is less than the distance between adjacent first means of the plurality of first means, the distance being located on the plane.

* * * * *